United States Patent
Lewis et al.

[15] 3,636,823
[45] Jan. 25, 1972

[54] HERMETICALLY SEALED MOTOR-COMPRESSOR APPARATUS

[72] Inventors: Ronald W. Lewis; Eric Smith, both of Bognor Regis, England

[73] Assignee: Lec Refrigeration Limited, Bognor Regis, Sussex, England

[22] Filed: June 22, 1970

[21] Appl. No.: 48,067

[30] Foreign Application Priority Data

Apr. 13, 1970  Great Britain.....................18,897/70

[52] U.S. Cl....................................92/187, 74/44, 92/237, 287/20 P
[51] Int. Cl..........................................F16j 1/18
[58] Field of Search ...............92/172, 187, 238, 237; 74/44; 287/20 P, 100

[56] References Cited

UNITED STATES PATENTS

| | | | |
|---|---|---|---|
| 1,784,291 | 12/1930 | Jardine | 92/238 X |
| 1,802,632 | 4/1931 | Darche | 92/237 |
| 1,925,706 | 9/1933 | Stanton | 74/44 |
| 1,943,364 | 1/1934 | Betz | 92/238 |
| 2,711,199 | 6/1955 | Salsberg | 64/2 P |
| 3,245,705 | 4/1966 | Fangman | 287/20 P |
| 3,403,605 | 10/1968 | Schmidt | 92/238 X |

FOREIGN PATENTS OR APPLICATIONS

| | | | |
|---|---|---|---|
| 686,883 | 4/1930 | France | 92/238 |
| 215,957 | 5/1924 | Great Britain | 92/187 |
| 1,032,360 | 6/1966 | Great Britain | 92/187 |

*Primary Examiner*—Edgar W. Geoghegan
*Assistant Examiner*—Irwin C. Cohen
*Attorney*—Cullen, Settle, Sloman & Cantor

[57] ABSTRACT

The present invention is concerned with improvements relating to hermetically sealed motor-compressor apparatus as used in the cooling systems of mechanical refrigerators. More particularly the invention relates to an improved reciprocating mechanism for linking or yoking a crankshaft to a compressor piston and according to the invention the cylindrical piston is provided with a protruding skirt having a crossmember to which is attached a tongue of appreciably less width than the piston. Through a bore in this tongue there passes a slide shaft which constitutes a yoke little end, the said tongue being secured to the slide shaft, e.g., by a pin. The tongue width is small and clearance is provided between the edges of the skirt and sidearms associated with the yoke big end and receiving the slide shaft so that one assembly as described may do service for a wide variety of piston member diameters.

4 Claims, 3 Drawing Figures

PATENTED JAN 25 1972  3,636,823

INVENTORS
RONALD WILLIAM LEWIS
ERIC SMITH

Cullen Settle Sloman & Cantor
ATTYS

HERMETICALLY SEALED MOTOR-COMPRESSOR APPARATUS This invention refers to hermetically sealed motor-compressor apparatus as used in the cooling systems of mechanical refrigerators and is more particularly concerned with the form of an improved reciprocating mechanism linking or yoking a crankshaft to a compressor piston.

An object of this invention is to provide a convenient and simple modified piston arrangement which allows standardization in size of a reciprocating yoke mechanism driving the piston to permit a wide range of piston diameters to be used with the same sized yoke mechanism. Another object of the invention is to permit the use of a yoke of relatively small weight with piston mechanisms of large diameter, or for those for use in small air-conditioning compressors. A further object of the invention is to enable an improved balance in reciprocating parts to be achieved.

In our British application No. 42681/69 dated Oct. 23rd 1969 we describe, among other things relating to a hermetically sealed motor-compressor apparatus as used in the cooling systems of mechanical refrigerators, an improved reciprocating yoke comprising a yoke big end embracing a crankshaft eccentric and a yoke little end comprising sidearms attached to the yoke big end and having apertures at right angles to the axis of the yoke big end, a transverse slide shaft which passes through the said apertures in the sidearms, and a preformed piston member locked to the said slide shaft.

From the descriptions and illustrations of method of construction and assembly of these parts it is evident that the piston member is there envisaged as substantially cylindrical over all its length and that the transverse slide shaft must pass through diametrically opposed bores in the skirt. It will be further evident that the span of the sidearms attached to the yoke big end must be such that the distance between their internal faces must be greater than the diameter of the piston member skirt plus twice the eccentricity of the yoke big end. If, then, it is required to use one size of yoke big end and sidearms with a variety of piston member diameters (which is a desideratum) the span between the sidearms must be adequate to accept the largest piston member plus the eccentricity allowance. This will require an undesirably large span, especially for the smaller diameters of piston member and may in consequence render the forced jet lubrication of the slide shaft inefficient. Such a large span for the sidearms is likely to make the component carrying them more expensive and to require appreciably larger dimensions for adequate strength than would be the case with a lesser span. Also, out-of-balance forces are greater with the greater span.

The improvement to be described effectively counters these disadvantages and enables a smaller, less weighty and less costly yoke construction to be used while conferring the advantage of improved balance in the reciprocating parts.

According to the invention an improved piston member for a hermetically sealed motor-compressor apparatus as used in the cooling systems of mechanical refrigerators comprises a cylindrical piston, which may be hollow over most of its length, with a protruding skirt which carries a crossmember to which is attached a projecting axial tongue of appreciably less width than the diameter of the piston member, and through which projecting tongue a transverse slide shaft can pass to form a yoke little end, the projecting tongue being secured to the slide shaft, and mechanical clearance being allowed between the edges of the skirt of the piston member and the adjacent parts of the sidearms forming a yoke little end.

The invention is further described with the aid of the accompanying drawings which illustrate one embodiment by way of example only, and in which.

Figure 1:
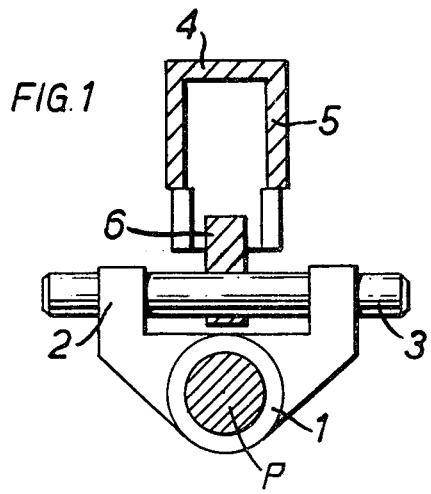
FIG. 1 is a plan part-section, part-view of a yoke big end, yoke little end and piston member assembly.
Figure 2:
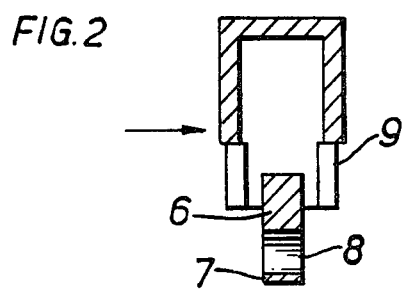
FIG. 2 is a section of the piston member of FIG. 1.
Figure 3:
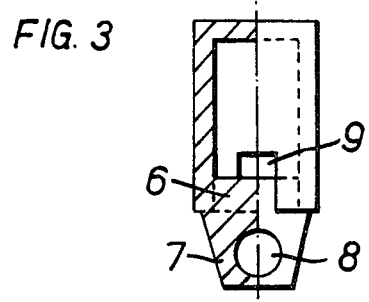
FIG. 3 is a part-section, part-view of the piston member looking in the direction of the arrow of FIG. II.

A yoke big end 1 has an aperture receiving the crankshaft eccentric pin P, and carries spaced sidearms 2 receiving a slide shaft 3 extending transversely of the longitudinal axis of a skirted piston member 4. The member 4 is preferably hollow over the greater part of its length and is machined to close limits over its outer surface 5. The pin P extends perpendicularly to the longitudinal axis of the slide shaft. At the end remote from the crown, piston member 4 carries a cross-member 6 and a flat tongue 7, preferably integral with one another and with the piston member.

Tongue 7 carries a transverse bore 8 to accept slide shaft 3 as a close fit. To prevent movement of the shaft relative to the tongue, the tongue 7 may also be secured to slide shaft 3 by a suitable cross pin. Tongue 7 projects beyond the edge of the skirt of piston 4 to such an extent that when bore 8 is made and slide shaft 3 is in position assembled to arms 2 there is adequate clearance between the said edge of the piston skirt and the adjacent ends of arms 2.

Two slots 9 of appreciable width are formed in the lower portion of the piston skirt on a line at right angles to the centerline of crossmember 6 (that is, parallel with bore 8). The closed ends of slots 9 are well above the inner level of crossmember 6 and so permit ready access to the inside of piston member 4 for pressure jet lubrication in the manner described in British application No. 42681/69.

It will be evident that as the width of tongue 7 is appreciably less than the diameter of piston member 4, and that as there is always clearance between the arms 2 and the end of piston member 4, one crankshaft and yoke big end/little end assembly may do service for a wide variety of piston member diameters. Provided the dimensions of sidearms 2, slide shaft 3 and tongue 7 are substantially enough for adequate strength (and these may be readily calculated from a knowledge of the mechanical properties of the materials used and of the horsepower to be transmitted) there now need only be provided sufficient distance between the inside faces of arms 2 to accommodate the width of tongue 7 plus twice the eccentricity of the crankshaft with a small clearance either side whatever may be the piston member diameter. Thus, if only a small range of piston diameters is envisaged, the yoke little end arms 2 may be relatively close together giving a compact sturdy unit of low moment of inertia and small out-of-balance resultants in working, or on the other hand a larger, but still compact yoke little end may cater for a wide range of piston diameters; in the latter instance there is an added advantage in that the motor-compressor unit as a whose can be designed to accept a wide variety of cylinder heads (to cooperate with the variety of piston diameters) within a single compact unit, thus enabling many components to be standardized over a variety of sizes and uses. Hitherto it has been necessary to increase the size of the motor-compressor unit as piston and cylinder size, and power, increased. This is now avoided.

What is claimed is:

1. In a hermetically sealed motor-compressor apparatus, a cylindrical piston having a protruding skirt with open end, a centrally located crossmember spanning and connected to said skirt open end, a tongue of appreciably less width than the diameter of the piston connected to and projecting from the crossmember and having a transverse bore, a slide shaft extending transversely of the longitudinal axis of the piston through the tongue bore and secured to the tongue against movement relative thereto, and a yoke having spaced apertured sidearms slidably receiving the slide shaft and having an aperture displaced from and having its axis at right angles to the axis of the sidearm apertures, adapted to receive a crankshaft eccentric pin extending perpendicularly to the longitudinal axis of the slide shaft, mechanical clearance being provided between the edges of the piston skirt and adjacent parts of the sidearms.

2. Hermetically sealed motor-compressor apparatus as defined in claim 1 wherein the said piston, crossmember and tongue are integrally formed.

3. Hermetically sealed motor-compressor apparatus as defined in claim 1 wherein the said piston has formed in its skirt slots of appreciable width, said slots being formed at positions away from the said crossmember and said slots opening above said crossmember.

4. Hermetically sealed motor-compressor apparatus as defined in claim 1 wherein the said cylindrical piston is hollow over the greater part of its length.

* * * * *